United States Patent

Dent et al.

[11] Patent Number: 5,841,816
[45] Date of Patent: Nov. 24, 1998

[54] DIVERSITY PI/4-DQPSK DEMODULATION

[75] Inventors: Paul W. Dent, Stehags, Sweden; Thomas M. Croft, Cary, N.C.

[73] Assignee: Ericsson Inc., Research Triangle Park, N.C.

[21] Appl. No.: 218,236

[22] Filed: Mar. 28, 1994

Related U.S. Application Data

[63] Continuation-in-part of Ser. No. 965,848, Oct. 22, 1992, Pat. No. 5,335,250.

[51] Int. Cl.$^6$ .............................. H04L 27/22; H04L 1/06; H04L 7/04; H04B 7/08
[52] U.S. Cl. ......................... 375/331; 375/332; 375/347; 375/366; 455/134; 455/137; 455/277.2
[58] Field of Search ............................... 375/85, 86, 339, 375/283, 347, 267, 366, 281, 332; 455/134, 277.2, 137, 139

[56] References Cited

U.S. PATENT DOCUMENTS

| | | | |
|---|---|---|---|
| 3,783,385 | 1/1974 | Dunn et al. | 375/83 |
| 3,987,422 | 10/1976 | Yanagidaira et al. | 340/207 P |
| 4,099,121 | 7/1978 | Fang | 375/281 |
| 4,531,235 | 7/1985 | Brusen | 455/134 |
| 4,871,974 | 10/1989 | Davis et al. | 375/85 |
| 4,879,728 | 11/1989 | Tarallo | 375/85 |
| 5,016,206 | 5/1991 | Shinonaga | 375/366 |
| 5,017,883 | 5/1991 | Divsalar et al. | 375/85 |
| 5,020,076 | 5/1991 | Cahill et al. | 375/56 |
| 5,031,193 | 7/1991 | Atkinson et al. | 375/96 |
| 5,048,059 | 9/1991 | Dent | 375/102 |
| 5,065,411 | 11/1991 | Muto | 375/347 |
| 5,084,669 | 1/1992 | Dent | 324/76.82 |
| 5,095,392 | 3/1992 | Shimazaki et al. | 360/40 |
| 5,109,392 | 4/1992 | McDonald | 375/85 |
| 5,122,758 | 6/1992 | Tomita | 329/304 |
| 5,140,613 | 8/1992 | Birgenheier et al. | 375/308 |
| 5,151,926 | 9/1992 | Chennakeshu et al. | 375/84 |
| 5,157,693 | 10/1992 | Lemersal, Jr. et al. | 375/56 |
| 5,165,057 | 11/1992 | Sharples | 455/273 |
| 5,182,749 | 1/1993 | Kazecki et al. | 370/100.1 |
| 5,187,719 | 2/1993 | Birgenheier et al. | 375/10 |
| 5,202,643 | 4/1993 | Sato | 329/309 |

(List continued on next page.)

FOREIGN PATENT DOCUMENTS

| | | | |
|---|---|---|---|
| 434 355 | 6/1991 | European Pat. Off. . | |
| 61-101134 | 5/1986 | Japan | 375/267 |

OTHER PUBLICATIONS

"Bird Watching", Dan Sweeney, *Cellular Business*, pp. 23–46, Jul., 1993.

*Primary Examiner*—Stephen Chin
*Assistant Examiner*—Jeffrey W. Gluck
*Attorney, Agent, or Firm*—Burns, Doane, Swecker & Mathis, L.L.P.

[57] ABSTRACT

A method and system for demodulating received signals in radio communication systems. Pi/4-DQPSK modulated signals can be demodulated to provide additional quality measurements and to facilitate diversity combination or selection. For example, a carrier is modulated with digital data using Pi/4-DQPSK to convey two bits of data by changing the radio carrier phase from the value at the end of the last symbol through an angle of either ±45 degrees or ±135 degrees, these four possibilities representing the bit pairs 00, 01, 11 or 10. The transitions of the radio signal are filtered in the complex (I,Q) plane to limit the spectrum. At the receiver, the received signal is downconverted, filtered and amplified using a hard-limiting intermediate frequency (IF) amplifier. The IF amplifier also produces an approximately logarithmic indication of the signal strength before limiting. The hard-limited IF signal containing phase information is fed to a direct phase digitizer. A numerical value representing instantaneous phase is produced and processed to demodulate data symbols. The demodulated data symbols can be combined with the logarithmic signal strength information to produce quality-annotated data bits to an error-correction decoder.

54 Claims, 3 Drawing Sheets

U.S. PATENT DOCUMENTS

| | | | |
|---|---|---|---|
| 5,202,901 | 4/1993 | Chennakeshu et al. | 375/84 |
| 5,203,027 | 4/1993 | Nounin et al. | 455/134 |
| 5,208,836 | 5/1993 | Edbauer | 375/85 |
| 5,214,687 | 5/1993 | Känsäkoski et al. | 379/60 |
| 5,220,275 | 6/1993 | Holmqvist | 324/76.82 |
| 5,241,545 | 8/1993 | Kazecki et al. | 375/365 |
| 5,260,673 | 11/1993 | Pham | 375/56 |
| 5,280,637 | 1/1994 | Larosa et al. | 375/347 |
| 5,289,504 | 2/1994 | Wilson et al. | 375/85 |
| 5,291,519 | 3/1994 | Tsurumaru | 375/347 |
| 5,295,162 | 3/1994 | Zarembowitch | 375/85 |
| 5,299,235 | 3/1994 | Larsson et al. | 375/365 |
| 5,325,403 | 6/1994 | Siwiak et al. | 455/134 |
| 5,335,250 | 8/1994 | Dent et al. | 375/10 |
| 5,347,535 | 9/1994 | Karasawa et al. | 455/52.3 |
| 5,363,412 | 11/1994 | Love et al. | 375/350 |
| 5,369,378 | 11/1994 | Kosaka et al. | 375/56 |
| 5,428,647 | 6/1995 | Rasky et al. | 375/366 |
| 5,436,942 | 7/1995 | Cheng et al. | 375/342 |
| 5,465,271 | 11/1995 | Hladik et al. | 375/331 |
| 5,488,638 | 1/1996 | Kazecki et al. | 375/347 |

DIVERSITY PI/4-DQPSK DEMODULATION

The following application is a continuation-in-part of U.S. patent application Ser. No. 07/965,848 filed on Oct. 22, 1992 and which is now U.S. Pat. No. 5,335,250.

BACKGROUND

The present invention relates to radiocommunication systems in general and, more particularly, to methods and systems for demodulating signals received in such systems.

Cellular radio systems are in the process of evolving from single channel per carrier analog frequency modulation systems (FDMA) using continuous transmissions to Time Division Multiple Access systems (TDMA) using pulsed transmissions. In TDMA systems, communication takes place between a base station and a plurality of mobile stations by allocating each connection therebetween a unique time slot in a time cycle. The resulting discontinuous or burst data transfer is smoothed out to produce intelligible speech by using, for example, a buffer memory and digital voice coding. The digitally coded voice is transmitted over the radio link using a digital modulation scheme like Pi/4-DQPSK. The use of Pi/4-DQPSK for digital TDMA cellular communications is described in the U.S. Telecommunications Industry Association standard IS54. Pi/4-DQPSK is a modulation that transmits pairs of data bits by incrementally rotating the phase of the signal vector through one of the four angles ±45 and ±135 degrees. During phase rotation, Pi/4-DQPSK modulated signals exhibit a frequency shift equal to the rate of change of phase and this frequency shift can be measured to demodulate the data bit-pair. The modulation suffers distortion in the transmission path due to delayed echoes from buildings, etc., requiring an equalizer in the mobile station in some instances. In cases where the echo delay is limited, the equalizer can be replaced with a frequency discriminator. Frequency discriminators are generally constructed using analog components which are unsuitable for integration in small silicon chips.

One way in which conventional systems combat this distortion is by way of diversity reception or transmission. Antenna diversity in TDMA systems has been implemented using either antenna selection diversity, in which antennas are tested to determine which yields the highest signal strength while the transmitter is sending data intended for another receiver in order to select the best antenna for reception of intended data, or diversity combining in which signals received from the two antennas are added either before (pre-detection combining) or after demodulation (post-detection combining). These conventional diversity techniques are problematic, however, in that fast fading can change which antenna receives the best signal after the test was made and an antenna chosen.

SUMMARY

According to the present invention this and other drawbacks and difficulties are overcome by an all-digital method of demodulating Pi/4-DQPSK signals using a direct phase digitizer combined with a diversity reception algorithm. Exemplary embodiments of the present invention also provide data bit quality measures for subsequent error correction decoding as well as facilitating diversity combining of two receiver channels.

According to exemplary embodiments, a carrier is modulated with digital data using Pi/4-DQPSK to convey two bits of data by changing the radio carrier phase from the value at the end of the last symbol through an angle of either ±45 degrees or ±135 degrees, these four possibilities representing the bit pairs 00, 01, 11 or 10. The transitions of the radio signal are filtered in the complex (I,Q) plane to limit the spectrum. At the receiver, the received signal is downconverted, filtered and amplified using a hard-limiting intermediate frequency (IF) amplifier. The IF amplifier also produces an approximately logarithmic indication of the signal strength before limiting. The hard-limited IF signal containing phase information is fed to a direct phase digitizer. A numerical value representing instantaneous phase is produced and processed to demodulate data symbols. The demodulated data symbols can be combined with the logarithmic signal strength information to produce quality-annotated data bits to an error-correction decoder.

According to some of the exemplary embodiments of the present invention, two antennas, receivers, IF amplifiers and phase digitizers are provided. The numerical phase values and approximately logarithmic signal strength values are processed jointly to produce demodulated data of improved quality which is fed to an error correction decoder. The decoded data may represent digitized speech and is then, for example, fed to a speech decoder to produce analog speech for driving a telephone earpiece or loudspeaker.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
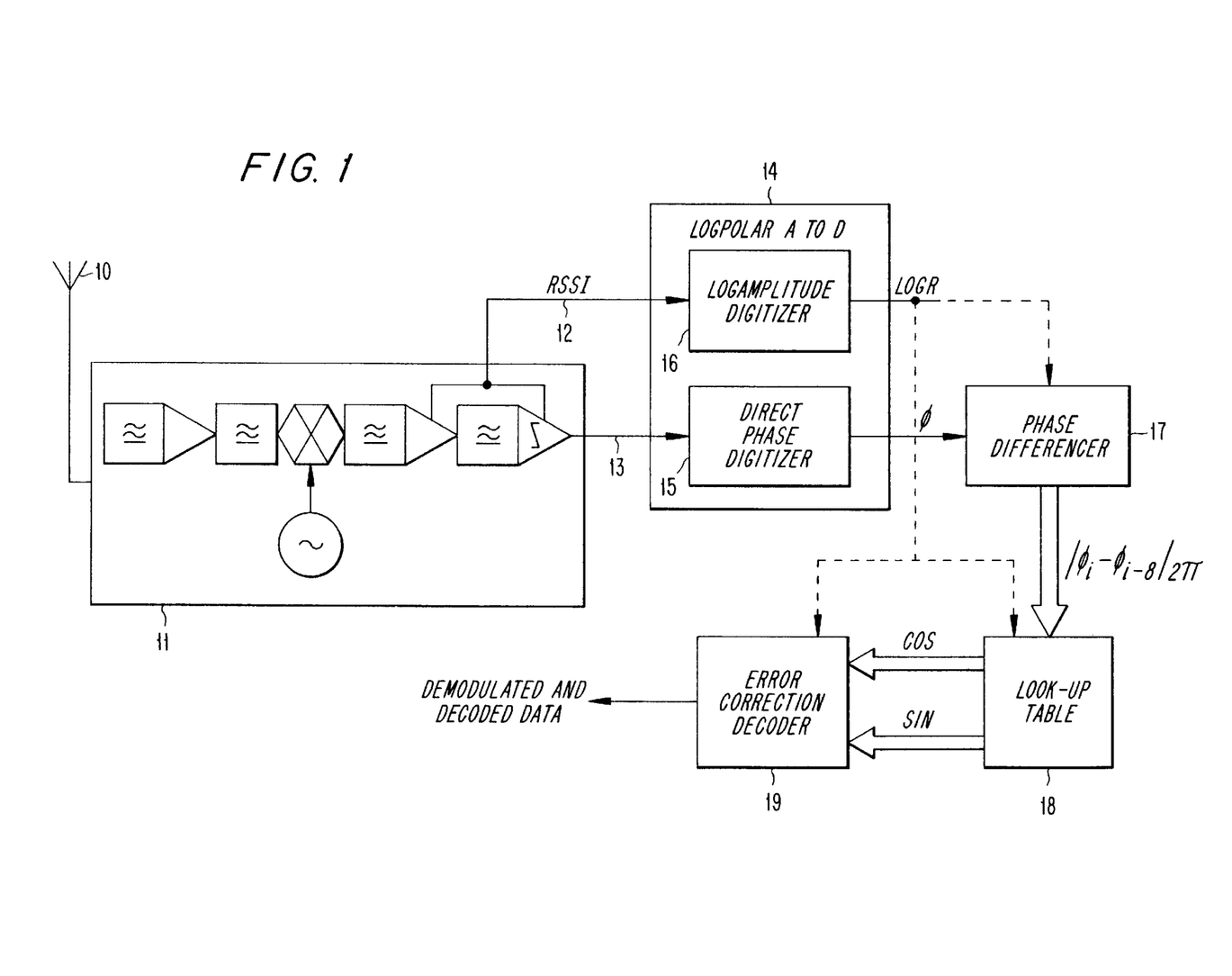
FIG. 1 is a block diagram of a single channel Pi/4-DQPSK receiver according to an exemplary embodiment of the present invention.

FIG. 1 shows a single channel receiver arrangement according to an exemplary embodiment of the present invention. A conventional method for processing incoming radio signals includes receiving, amplifying and splitting the signal into in-phase and quadrature (I,Q) Cartesian components and digitizing them to yield a stream of complex numbers for processing. An advantageous alternative to Cartesian digitization is described in U.S. Pat. No. 5,048,059 to Paul W. Dent, entitled "Logpolar Signal Processing" which patent is incorporated here by reference. In the logpolar method, the signal is digitized, not as Cartesian components (I,Q), but as polar components including a phase angle and a logarithmic measure of vector amplitude or radius. These values can be numerically converted to Cartesian (I,Q) components if so desired after digitization using suitable digital signal processing. An advantage of logpolar digitization is the achievement of high instantaneous receiver dynamic range without the use of automatic gain control. U.S. Pat. No. 5,084,669 to Paul W. Dent, entitled "Direct Phase/Frequency Digitization" describes different methods of directly digitizing the phase of a hardlimited radio signal, which disclosure is also incorporated here by reference. U.S. Pat. No. 5,220,275 to Peter Holmquist entitled "Accumulator Phase Digitizer" describes yet another method of direct phase digitization which may be used to implement the present invention and is also incorporated here by reference. U.S. patent application Ser. No. 07/965,848, entitled "Bidirectional Demodulation Method and Apparatus" further describes the demodulation of TDMA radio bursts by digitizing the signal, recording in a memory and then demodulating it forward or backward from a starting point of known data symbols surrounding unknown data and selecting results from whichever direction of demodulation yields highest data quality.

Direct phase digitization is herein defined to include any device or method for producing numerical values of the instantaneous phase of a complex signal that does not involve first splitting the signal into real and imaginary or Cartesian components and computing an arctangent therefrom.

According to the invention, a first station modulates signals using PI/4-DQPSK and transmits the modulated signals to a receiver shown in FIG. 1 having antenna 10. The first station employs low-pass filters having a frequency response which is a square root of a Nyquist filter for a given symbol rate. The Nyquist filter has a raised cosine frequency response.

In FIG. 1, the transmitted signal is received from antenna 10, downconverted, filtered and amplified in superheterodyne receiver 11 to produce a signal indicative of instantaneous signal strength (RSSI) 12 and a hardlimited intermediate frequency signal 13 to logpolar digitizer 14. The logpolar digitizer 14 may operate according to the aforementioned U.S. Pat. No. 5,048,029 and includes at least a direct phase digitizer 15 such as described in the aforementioned documents which have been incorporated by reference. According to a first exemplary embodiment of the invention, only phase is digitized and Pi/4-QPSK demodulated therefrom. In another exemplary embodiment to be described later, the RSSI signal is also digitized in A to D convertor 16 and both phase and RSSI signals are jointly processed to provide quality annotated demodulated bits to an error-correction decoder.

Phase digitizer 15 produces a stream of numerical values representing the instantaneous phase of the signal in modulo-2Pi form. Modulo-2Pi form means that the integer numerical value K representing phase angle can take on values between 0 and M-1 to represent the phase angle K/M×2Pi. An integer value of K=M would therefore represent the angle 2Pi which is the same as the angle 0. In modulo-M arithmetic, the values M and 0 are represented identically corresponding to the identity of angles 0 and 2Pi. More specifically, using binary arithmetic of, for example, an 8-bit wordlength, the values 00000000 (0) to 11111111 (255) represent angles of 0 to 255/256×2Pi. Upon adding one unit to 11111111 we get (1)00000000 where the leftmost digit 1 overflows outside the 8 bit range and is dropped, leaving the value 00000000 (0) corresponding to 0 degrees again. Thus, the circular operation of finite wordlength arithmetic is mapped onto the circular phase angle domain.

Pi/4-QPSK signals are demodulated according to this exemplary embodiment using a modulo-2Pi phase differencer 17 which subtracts the phase value digitized one symbol time earlier from the current phase value to obtain a phase difference value. The phase difference value is used as an address for a look-up table 18 connected to the input of digital logic, the output from which is two bits of demodulated data corresponding to the 90 degree quadrant in which the phase difference lies.

It is desirable that demodulation produce not only demodulated data bits, but also an indication of their credibility to error-correction decoder 19. This can be achieved using look-up table 18 by storing values corresponding to the cosine and sine of the phase difference. These so-called soft values indicate one bit polarity of the demodulated quaternary symbol in the sign of the cosine component and the other bit in the sign of the sine component. The magnitudes of the sine and cosine indicate the quality or credibility of the bits. The nominal phase differences between consecutive symbols using Pi/4-QPSK are ±45 or ±135, that is in the middle of the quadrants. The magnitudes of the cosines and sines of such angles are 1/root(2). If a phase difference around 0 degrees is encountered, the cosine will be +1 giving a reliable indication that its sign is positive, while the sine magnitude is around zero, indicating a very unreliable determination of the sign of the sine. These measures of reliability may be used in error-correction decoder 19 to assist in pin-pointing and correcting likely erroneous bits.

The error correction coder 19 processes those symbols representing coded information using said measures of reliability to produce decoded symbols. A number of symbols representing less critical information may be transmitted uncoded, and these are therefore not decoded by the error correction decoder. In the later described exemplary embodiment, the RSSI signal is also digitized and taken into account in determining bit reliability. The RSSI signal may be combined after digitizing with the phase value and converted to Cartesian complex representation Z=(I,Q). Denoting the value one symbol period ago by Z(i-1) and the current value by Zi, the value Zd=(Xd,Yd)=Zi·(Zi-1)* is formed where * denotes complex conjugate. The real part of Zd (Xd) then represents the "soft" value of one data bit and the imaginary part Yd represents the soft value of the second data bit of quaternary symbol number "i". Alternatively, in polar notation, Xd and Yd may be expressed as follows:

$$Xd=Ri·R(i-1)·COS [Ai-A(i-1)]$$

$$Yd=Ri·R(i-1)·SIN [Ai-A(i-1)]$$

in which Ai represent phase values and Ri represent corresponding amplitude values. The multiplications denoted by the "·" symbol convert to addition when logarithmic values are used.

Hence: $LOG (XD)=LOG (Ri)+LOG [R(i-1)]+LOGCOS [Ai-A(i-1)]$ $LOG (YD)=LOG(Ri)+LOG [R(i-1)]+LOGSIN [Ai-A(i-1)]$ Since the RSSI value is produced in logarithmic form corresponding to LOG(R) values and the look-up table 18 holds values of LOGCOS and LOGSIN of the angle differences, instead of COS and SIN, the calculation of soft bit values may be carried out according to the above equations using only short wordlength, fixed point adders and without multipliers (not shown).

If necessary, the logarithmic values of Xd and Yd can be converted to linear values by means of an antilog table, but it may be convenient to retain the values in logarithmic form to be able to represent a wide dynamic range of values with short wordlengths. The subsequent error-correction decoder that processes the soft values can easily be arranged to accept them in logarithmic form and either use them in a logarithmic arithmetic unit or convert them to linear values by means of an antilog function. To obtain good performance it is desirable to sample and digitize the incoming signal at the optimum points within each symbol period. These sampling instants should correspond to the phase angle having just completed its rotation through ±45 or ±135 from an old to a new value. The optimum sampling instants can be determined by sampling at, for example, eight uniformly spaced points over the symbol period, and then deciding which of the eight sampling phases to use for demodulation as described below.

A TDMA signal segment comprises, for example, a first pattern of known symbols at the beginning, a number of unknown symbols to be determined, and a second pattern of known symbols at the end. The first and second patterns of known symbols are sometimes referred to as "syncwords". By correlating the eight possible sample phases of the received signal with the known first pattern and picking the sample timing that yields the greatest correlation, the optimum sample timing for demodulation is determined.

For example, denoting successive samples taken ⅛th of a symbol apart by $Z1, Z2, Z3 \ldots Zi \ldots$ and the sample values that the known symbols should produce by $T1, T2, T3 \ldots Ti \ldots$ the correlation values $$C1 = Z1 \cdot T1^* + Z9 \cdot T2^* + Z17 \cdot T3^* \ldots + Z(8n-6) \cdot Tn^*$$

$$C2 = Z2 \cdot T1^* + Z10 \cdot T2^* + Z18 \cdot T3^* \ldots + Z(8n-6) \cdot Tn^*$$

$$C3 = Z3 \cdot T1^* + Z11 \cdot T2^* + Z19 \cdot T3^* \ldots + Z(8n-5) \cdot Tn^* \text{ etc. are calculated.}$$

Whichever of the complex correlations has the greatest magnitude determines the selected sampling phase for demodulation. Suppose, for example, that C3 has the greatest magnitude, then the subset of samples Z3, Z11, Z19, Z27 . . . etc. is chosen for demodulation. Because of the ⅛th symbol sample spacing, it is seen that successive values of Z used have indices separated by eight now instead of one. Thus soft bit values are calculated using:

$$Zd = (Xd, Yd) = Zi \cdot Z^*(i-8)$$

or, in polar notation:

$$Xd = Ri \cdot R(i-8) \cdot \cos[Ai - A(i-8)]$$

$$Yd = Ri \cdot R(i-8) \cdot \sin[Ai - A(i-8)]$$

or, in logarithmic form:

$$\text{LOG}(XD) = \text{LOG}(Ri) + \text{LOG}[R(i-8)] + \text{LOGCOS}[Ai - A(i-8)]$$

$$\text{LOG}(YD) = \text{LOG}(Ri) + \text{LOG}[R(i-8)] + \text{LOGSIN}[Ai - A(i-8)]$$

When fading is encountered on the channel, it is possible that the first syncword is corrupted, hindering the correct determination of the best sampling phase. In a manner similar to that described in the above-incorporated U.S. patent application Ser. No. 07/965,848, correlation values can also be calculated using the second syncword. Depending on the relative credibilities of the correlation results, the data can be demodulated in a forward direction, i.e., from the first syncword as a reference, in a backward direction from the second syncword, or from both directions. Before defining a measure of syncword credibility, a method of determining how such values can be used to decide one or more demodulation directions will be generally outlined below.

Suppose, for example, that syncword credibility values are definable in some way and quantized to a limited number of cases such as high, medium and low credibility. Then the combination of credibility values for the two syncwords yields nine different cases. For each case, the optimum demodulation strategy that gives the lowest symbol error rate in the mean can be determined in advance by simulation, and a decision table containing nine entries built into the equipment. For example, the decision table in this simplified example could be:

TABLE 1

| | | Syncword1 credibility | | |
|---|---|---|---|---|
| | | LOW | MEDIUM | HIGH |
| Syncword2 credibility | LOW | Half forward, Half backward | Forward | Forward |
| | MEDIUM | Backward | Half forward Half backward | Forward |
| | HIGH | Backward | Backward | Half forward Half backward |

To determine which demodulation direction is optimal to fill out the above table, the following procedure can be carried out.

A computer simulation of the transmitter, fading channel and receiver is executed and received TDMA signal segments are categorized according to the nine possible cases of syncword credibility defined above. Then, for each category, the symbol error rate is computed separately for the three cases of demodulation direction, i.e., forward, backward or half forward, half backward, abbreviated now to F, B and H. The number of symbol errors encountered is accumulated separately in 3 times 9, or 27, counters corresponding to each demodulation case used with each category of sync quality pairs. For each category, the demodulation direction F, B or H which gave the lowest total number of symbol errors for that category is then selected to be placed in the above decision table. As a further development of this novel process, it will now be explained how the syncword credibility can be optimally quantized into a limited number of levels, for example, as the three values "low", "medium" and "high" postulated above.

Suppose an unquantized or continuous measure of credibility is available. This can first be finely quantized into a larger number of cases, such as sixteen. Then there are 16×16=256 possible combinations of the credibility of the two syncwords. Extending the simulation procedure to compute the total number of symbol errors in each of the 256 signal quality categories using each demodulation direction in 3×256 counters, and then determining for each category which demodulation strategy F, B or H gave the least number of errors, develop a table like Table 2, below.

TABLE 2

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | H | H | F | F | F | F | F | F | F | F | F | F | F | F | F | F |
| 1 | H | H | H | F | F | F | F | F | F | F | F | F | F | F | F | F |
| 2 | B | H | H | H | F | F | F | F | F | F | F | F | F | F | F | F |
| 3 | B | B | H | H | H | F | F | F | F | F | F | F | F | F | F | F |
| 4 | B | B | B | H | H | H | F | F | F | F | F | F | F | F | F | F |
| 5 | B | B | B | B | H | H | H | F | F | F | F | F | F | F | F | F |
| 6 | B | B | B | B | B | H | H | H | H | F | F | F | F | F | F | F |
| 7 | B | B | B | B | B | H | H | H | H | F | F | F | F | F | F | F |
| 8 | B | B | B | B | B | H | H | H | H | H | H | F | F | F | F | F |
| 9 | B | B | B | B | B | B | H | H | H | H | H | H | F | F | F | F |
| a | B | B | B | B | B | B | B | H | H | H | H | H | H | H | H | F |
| b | B | B | B | B | B | B | B | H | H | H | H | H | H | H | H | F |
| c | B | B | B | B | B | B | B | B | H | H | H | H | H | H | H | H |
| d | B | B | B | B | B | B | B | B | B | H | H | H | H | H | H | H |
| e | B | B | B | B | B | B | B | B | B | H | H | H | H | H | H | H |
| f | B | B | B | B | B | B | B | B | B | B | B | H | H | H | H | H |

In practice, statistical variations may not yield a table which is perfectly symmetrical like the table above, but due to theoretical reasons for expecting time-reversal symmetry, a non-symmetric table may first be corrected to a symmetrical one. For example if the row 2, column 1 entry had been B instead of H, the error count penalty can be examined in correcting the row 2 column 1 entry to H compared with correcting the row 1, column 2 entry to F, and choose that with the lowest penalty.

For example, suppose the simulations for the sync quality category of row 2 column 1 yielded the following results:

| TOTAL ERROR COUNT | DEMODULATION DIRECTION |
|---|---|
| 4819 | F |
| 3116 | H |
| 3102 | B |

In this case, selecting the lowest error count would have yielded B in the row 2 column 1 position which is not symmetrically compatible with an H in row 1 column 2. It would, however, be compatible with an F in row 1 column 2.

Suppose now the simulations for row 1 column 2 has yielded:

| TOTAL ERROR COUNT | DEMODULATION DIRECTION |
|---|---|
| 3018 | F |
| 3009 | H |
| 3917 | B |

The penalty in changing the H to an F in row 1 column 2 in order to force symmetry would be an increase in total errors from 3009 to 3018, a penalty of 9 extra errors.

Alternatively, we could have forced symmetry by selecting H in row 2 column 1. This would have increased total errors from 3102 to 3116, an increase of 14. Since the latter is worse, the former way of forcing symmetry would be chosen.

Next the table may be divided up into coarse regions in which the demodulation strategy is approximately uniform, as follows:

| H | F | F |
|---|---|---|
| B | H | F |
| B | B | H | as originally surmised in Table 1. As previously illustrated, the error rate penalty in changing any F, B or H entry in Table 3 to the dominant entry for one of the nine regions may be determined. Thus, the total penalty in forcing the same type of demodulation, F, B or H to be used consistently in each region can be calculated. This penalty calculation may also be repeated for each possible position of the two horizontal and two vertical dividing lines in Table 3 that delineate the nine regions. The positions of the four dividing lines are then chosen to be those which incur minimum penalty in error rate in forcing conformity in each of the nine regions. Thus, the optimum quantizing of the sync qualities values 0,1,2 . . . e,f into only three broader regions which may be called "GOOD", "MEDIUM" and "BAD" has been systematically determined. The result can then be permanently built into the logic of the equipment to perform the optimum quantizing, along with the decision on demodulator type (F, B or H) that was optimum for each of the quantized regions. The boundaries between the nine regions have now been systematically determined by evaluating the increase in total number of symbol errors for each possible boundary position and for unifying the demodulation strategy in each region to any of F, B or H. The boundary positions and best decision strategy for each region are thus systematically determined for lowest net symbol error rate. This provides an explanation of how a continuous syncword credibility measure can be coarsely quantized to reduce the size of the look-up table needed to hold demodulation strategies.

It will be appreciated by those skilled in the art that tables of size much greater than 3×3 entries can be used in practice, with modern memory technology. The above example uses tables of size 3×3 for the purpose of illustration only, but the procedure may be used for much larger tables, such as 8×8.

It will now be described how a measure of syncword credibility or quality can be obtained. When direct differential phase demodulation as outlined above is used, the purpose of correlation with the syncword is to define the best

TABLE 3

|   | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | H | H | F | F | F | F | F | F | F | F | F | F | F | F | F | F |
| 1 | H | H | H | F | F | F | F | F | F | F | F | F | F | F | F | F |
| 2 | B | H | H | H | F | F | F | F | F | F | F | F | F | F | F | F |
| 3 | B | B | H | H | H | F | F | F | F | F | F | F | F | F | F | F |
| 4 | B | B | B | H | H | H | F | F | F | F | F | F | F | F | F | F |
| 5 | B | B | B | B | H | H | H | H | H | F | F | F | F | F | F | F |
| 6 | B | B | B | B | B | H | H | H | H | H | F | F | F | F | F | F |
| 7 | B | B | B | B | H | H | H | H | H | F | F | F | F | F | F | F |
| 8 | B | B | B | B | B | H | H | H | H | H | H | F | F | F | F | F |
| 9 | B | B | B | B | B | B | H | H | H | H | H | H | F | F | F | F |
| a | B | B | B | B | B | B | B | H | H | H | H | H | H | F | H | F |
| b | B | B | B | B | B | B | B | H | H | H | H | H | H | H | F |
| c | B | B | B | B | B | B | B | B | H | H | H | H | H | H | H |
| d | B | B | B | B | B | B | B | B | B | H | H | H | H | H | H |
| e | B | B | B | B | B | B | B | B | B | H | H | H | H | H | H |
| f | B | B | B | B | B | B | B | B | B | B | B | H | H | H | H |

The demodulation strategy in each region of Table 3 is then changed to the predominant strategy giving, for the nine regions:

sampling timing within the symbol period. The best sampling phase is that which would result in lowest error rate, that is, the timing that gives the greatest signal-to-(noise+interference+ISI) ratio. If the syncword vectors Ti used for correlation are of unit length, then the correlation with the highest magnitude indicates the best sampling phase. Moreover, the magnitude squared indicates how much received signal energy correlates with the syncword while the difference between the total received energy and the syncword energy represents all unwanted energy. If the largest correlation is, for example, C2, then the total signal energy at that timing is:

$$E = Z2 \cdot Z2^* + Z10 \cdot Z10^* + Z18 \cdot Z18^* \ldots + Z(8n-6)^* \cdot Z(8n-6)$$

The desired signal energy content in this signal is $S=|C2|^2$. Therefore, a measure of syncword quality is $S/(E-S)$. This is a multidigit numerical value that can then be quantized according to the method outlined above.

Alternative syncword quality measures can, of course, be defined. For example, having determined the optimum sampling phase, this can be used to demodulate the symbols of the syncword; comparing the results with the a-priori known values, the number of symbol errors in the syncword can be determined and used as a measure of syncword quality.

Thus, it has been shown above how measures of quality for sync correlation can be obtained, how the quality can be coarsely quantized to a limited number of values, and how the coarsely quantized qualities of two known syncwords can be used to decide the optimum demodulation strategy for unknown data lying between them. Note that the procedure described may be applied to decide among any number of alternative demodulation strategies, and not just between forward or backward differential phase demodulation with different sampling phases. For example, another demodulation strategy that could be included in the available repertoire might be a quasi-coherent algorithm. In quasi-coherent demodulation, an unknown data symbol is demodulated not by using the sample one symbol period earlier but by using an estimate of the signal vector one symbol period earlier. For the first unknown data symbol (i.e., that nearest the known syncword pattern) this estimate is derived from the chosen correlation result 'Cj' by computing:

$$Zref = CjTn/n.$$

The first data symbol is demodulated then by means of:

$$Zd = Z(j+8n) \cdot Zref^*$$

Zref is then updated by rotating it through an angle of ±45 or ±135 degrees as indicated by the quadrant in which Zd lies, and then adding a fraction of the difference between Zref and Z(j+8n). For example, suppose Zd lies in the first quadrant. Then compute:

$$Zref = Zref \cdot EXP\ (jPi/4)$$

$$Zref = Zref + [Z(j+8n) - Zref]/16$$

to obtain a new value of Zref for demodulating the second data symbol.

Because the reference vector Zref is either carried backward or forward depending on the chosen direction of demodulation, the quasi-coherent scheme exhibits more direction-dependence than merely choice of sampling timing from the first or second syncword. In the quasi-coherent scheme, different symbol error rates will be obtained for the two directions even when the sampling phase given by the two syncwords is the same, whereas differential phase demodulation is direction independent in that case. Thus the correct choice of demodulation direction given by the precomputed decision table may be expected to be more significant.

As a further demodulation strategy, an echo equalizing algorithm can be provided. When correlation exhibits high energy at + or − one symbol period away from the correlation peak, this is indicative of echoes or time-dispersion that may need to be compensated for correct demodulation. It is beyond the scope of the present invention to describe all possible constructions of equalizers, however, one step that can be taken to reduce the effect of echoes will be described for purposes of completeness. It can be shown that the effect of echoes or time dispersion is, among other things, to add a complex constant to the result of computing:

$$Zd = Zi \cdot Z(i-8)^*$$

such that the possible values of Zd are no longer distributed around a circle center (0,0) but around an offset center. Subtracting this complex constant from Zd before determining the quadrant it lies in, or before passing its real and imaginary parts as soft bit values to the error correction decoder, results in a reduction of symbol errors. The choice as to whether or not to invoke this strategy can depend on the results of correlation from which an estimate of the complex offset can be computed. Comparing this estimated offset with a threshold, it may be coarsely quantized into 'significant' or 'insignificant' in a manner determined analogously to the sync quality quantization previously described. This classification is then used to determine whether offset correction is employed or not. In general, the method permits classification of received TDMA bursts into the 36 possible cases of High, Low and Medium sync quality for both syncwords times the two cases per syncword of significant/insignificant offset due to time dispersion, and the evaluation off-line of all available demodulation strategies for each classification in order to construct a look-up table indicating the best-on-average strategy to employ for each case, the precomputed table then being built into the equipment.

The above-described exemplary embodiments can be extended to cases where more than two known symbol patterns are included in each TDMA transmission, for example, by use of the so-called Digital Voice Color Code (DVCC) defined in TIA standard IS54 as a known symbol pattern, as well as the syncwords. Such a case can be treated as two instances of unknown data bounded by known data patterns, and the present invention can be applied separately for each instance. The above-described exemplary embodiment can also be extended to the case of diversity reception, where the choices for demodulating unknown data include choosing the signal source from among a number of antennas.

Figure 2:
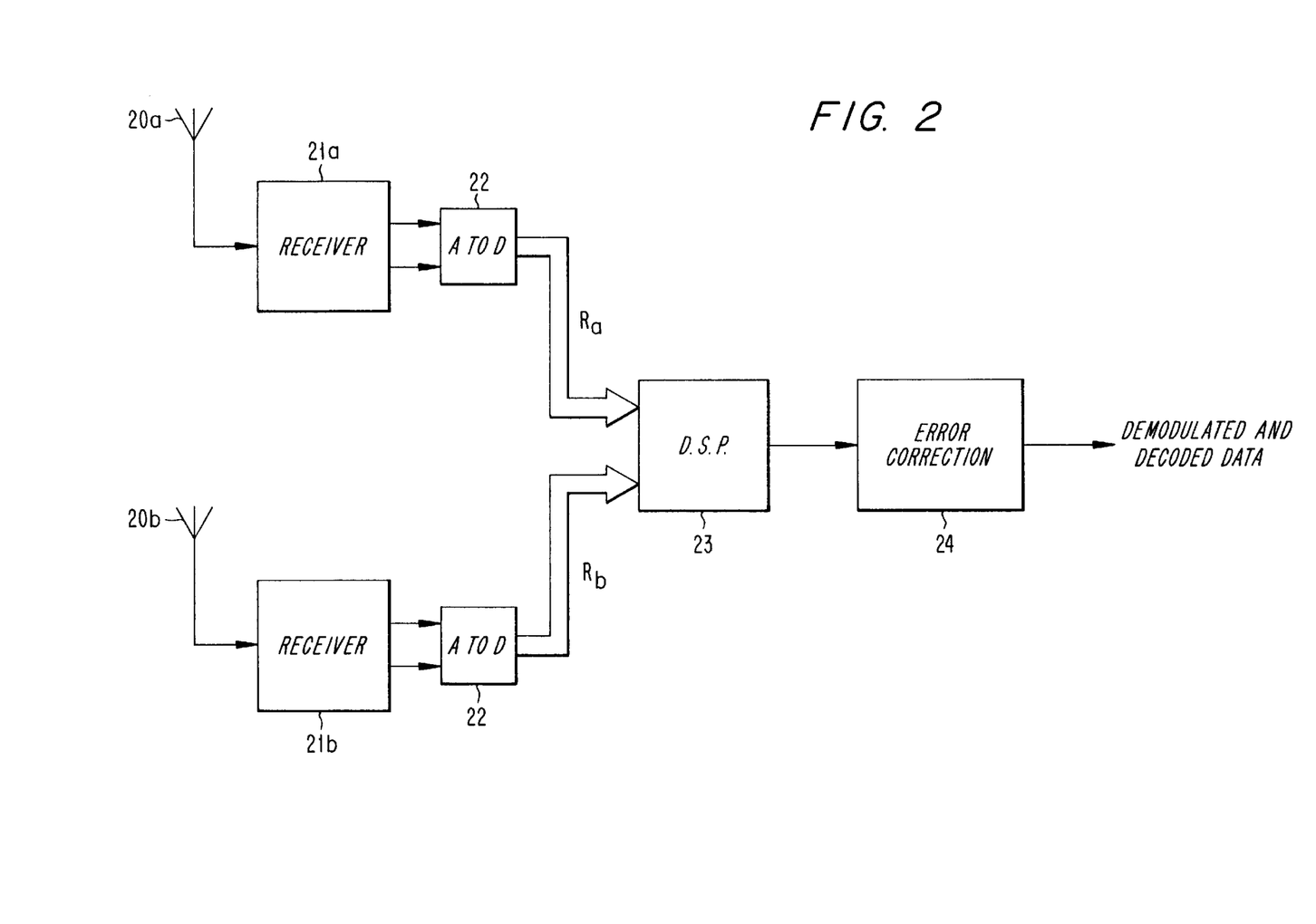
FIG. 2 is a block diagram of an exemplary dual diversity receiver according to the present invention.

FIG. 2 shows a dual-diversity receiver according to another exemplary embodiment of the present invention. Antennas 20a and 20b receive nominally the same signal but due to slight position or polarization differences between them, the signal-to-interference ratios are not identical. The two signals are amplified, filtered and downconverted in superheterodyne receivers 21a and 21b, before being digitized by A to D convertors 22. The digitized signal values are passed to digital signal processing unit 23, which processes these values as described below.

Sync correlations can be computed in the same manner described above for the single channel, non-diversity case, but this time for the signals from both receivers. Sync correlation qualities are computed using, for example, one of the previously described methods, the sync qualities coarsely categorized by comparison with predetermined thresholds, and the combination of quantized sync qualities for all sync correlations used to select a demodulation strategy and the choice of signal source to demodulate. For example, if each TDMA signal segment consists of two known symbol patterns (syncwords) with unknown data symbols between, then the choice of forward, backward or half forward, half backward demodulation using signals from either antenna 'a' or 'b', gives six possible choices. The best choice can be a function at least of the four sync quality measures. As described previously, the function describing how the best choice of demodulation direction varies relative to sync qualities can be precomputed by off-line simulation using every demodulation strategy to demodulate TDMA signal segments of all sync quality classes, and the strategy giving the lowest number of symbol errors for each class can then be recorded in a look-up table that may be built into the equipment.

Even with, for example, only two antennas, the number of choices of signal source can be artificially increased by forming, inside the digital signal processing unit 23, a weighted sum or difference of the signals from the two antennas. The sum and difference can be treated as third and fourth candidate signal sources, or as the two primary candidates. Moreover, the weighting factors used to compute the sum or difference can depend on the correlations computed for the original two signals. In particular, the correlations provide information on the relative phase of the signals from the two antennas, which can be used to determine weights such that constructive addition takes place. In addition, the weights can be derived from correlations with syncwords lying before or after the unknown data symbols. Thus, a weighted sum formed with a first set of weights and a weighted sum formed with a second set of weights can be regarded as two alternative signal sources as well as the two original signals. Each of these four signals can be chosen to be demodulated forward from the first syncword, backward from the second syncword or half and half. This provides a total of eight possible ways to obtain demodulation results for the first half of the unknown symbols and eight possible ways to obtain demodulation results for the second half of the unknown symbols. The choice of the leftmost syncword as a demodulation reference can be excluded when the rightmost syncwords were used to form the weighted addition, and vice versa. However, it is not necessary to exclude this possibility from the offline simulation; rather, the results of offline simulation will verify or invalidate this assumption. As before, the choice of demodulation strategy is precomputed as a function of the coarsely quantized sync qualities and built into a look-up table or digital logic forming part of the digital signal processing unit 23.

Figure 3:
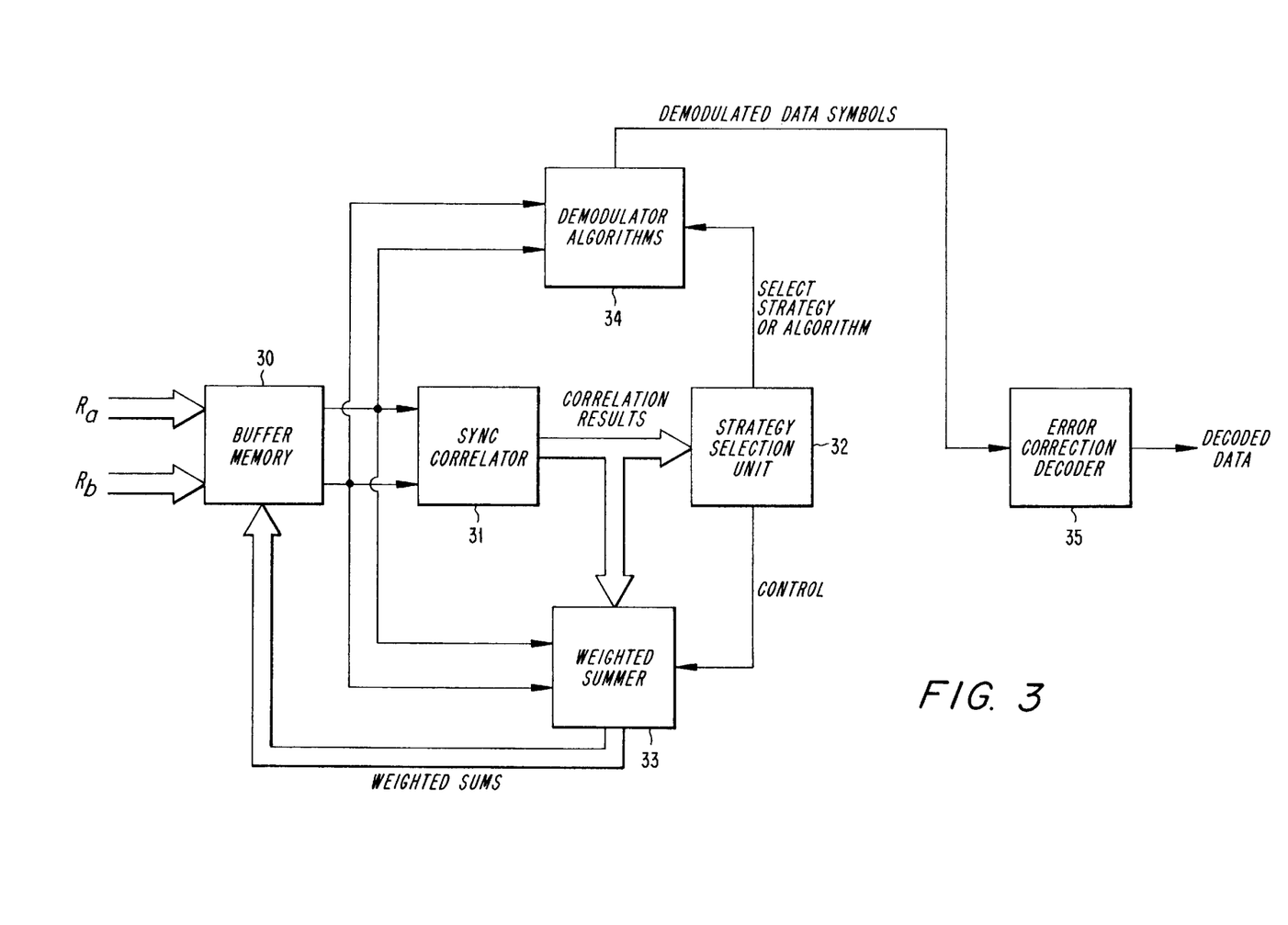
FIG. 3 is a block diagram of an exemplary configuration of the signal processing unit of FIG. 2.

A block diagram of an exemplary signal processing unit 23 for the receiver of FIG. 2 is shown in FIG. 3. The digitized signals from the two antennas are first recorded in a buffer memory 30 from which they can be recalled by a sync correlator 31. The sync correlator recalls samples of the first and second signal sources for correlation with the first syncword and then samples of the first and second signal sources for correlation with the second syncword, thereby producing four sets of correlation results. Each set of correlation results includes at least an indication of the sample timing giving maximum correlation, the complex value of the maximum correlation and a correlation quality measure, but can also include the complex correlation values at all sample phases. Correlation results are passed to the strategy selection unit 32 and to the weighted summer 33. The strategy selection unit also controls the selection from among a number of possible demodulation algorithms or strategies that demodulator 34 is able to perform. Demodulated data symbols plus soft quality information is passed from demodulator 34 to error correction decoder 35 which can perform interleaving to disperse errors in time.

The weighted summer 33 can operate in one of two general ways depending on whether samples from the two signal sources with a time offset between them are combined or not. This choice can either be predetermined or can be a function of the sync qualities already provided to the strategy selection unit 32.

For exemplary embodiments where combination of samples from the two signal sources occurs only for samples taken at the same time, the weighted sum is computed as follows. For sample phase 'i', yielding correlation Ca(i) on one source and Cb(i) from the other source, the weighted sum is formed as:

$$Rs1(i+8k)=Ra(i+8k)\cdot Ca(i)^*+Rb(i+8k)\cdot Cb(i)^*$$

for i ranging over the number of sample phases (e.g., 1 to 8) and k ranging over the number of symbol periods in the memorized signal segment. It can be seen that samples one symbol period (e.g., every 8 samples) apart starting with sample number 'i' are combined using correlation values 'i' as weights. The weighted sum Rs1 is returned to memory where it can be recalled by the correlation computer 31 and a set of correlation results are computed in the same manner as for the two original signals and supplied to the strategy selection unit. This is also done using the correlation results for the second syncword to obtain Rs2.

In the case where a combination of the two signal sources is permitted with a time offset, the best sample phase 'i' that yields the maximum correlation with the first signal source is combined with the best sample phase 'j' of the second signal source as follows:

$$Rs1(8k)=Ra(i+8k)\cdot Ca(i)^*+Rb(j+8k)\cdot Cb(j)^* \text{ for all } k.$$

In this case only a single sample phase is produced for the sum, so further correlation is not needed to determine the best sample phase. An Rs2 array is computed in a similar manner using a Ca and Cb computed based on the second syncword. Phase 'i' of Ra, phase 'j', of Rb and Rs1 and Rs2 are then the available candidates for forward or backward demodulation. In this case, the choice of signal and demodulation strategy is predetermined only by the original four correlation results, thus the weighted sum Rs1 or Rs2 need only be computed if the indicated strategy calls for them.

As a third way of determining the weighted sums, it is possible to diversity combine the two sources of Pi/4-DQPSK signals after differential demodulation but prior to symbol detection as follows:

$$Rs(8k)=Ra(i+8k)\cdot Ra(i+8k-8)^*+Rb(j+8k)\cdot Rb(j+8k-8)^*$$

This equation has the desirable property that the contribution from each term falls as the square of the signal amplitude. Moreover, constructive addition occurs independently of the received signal phases. Therefore, it is also possible to effect diversity combination using this method before performing sync correlation. This can be accomplished by computing:

$$Rs(i)=Ra(i)\cdot Ra(i-8)^*+Rb(i)\cdot Rb(i-8)^*$$

Sync correlation is then performed on Rs to determine symbol timing. In this case, because Rs is a differential signal sample array, correlation is performed using differential known symbol patterns, and not absolute known signal vectors, as previously. The differential syncwords are given by $Ti\cdot T(i-1)^*$ and are one symbol shorter than the absolute syncwords. Correlation with a first and second known differential symbol pattern can still be performed, quantized quality measures generated and used in selection of demodulation direction or mode.

A receiver according to exemplary embodiments of the present invention can provide demodulation mode diversity without antenna diversity. An exemplary block diagram for such a receiver would be the same as FIG. 3 but with only one input, Ra or Rb, to the buffer memory 30 instead of two.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims.

What is claimed is:

1. A method of demodulating and decoding quaternary phase modulated signals comprising the steps of:

receiving said quaternary phase modulated signals and producing a hardlimited intermediate frequency signal, directly phase digitizing said hardlimited intermediate frequency signal to produce a stream of numerical values representing instantaneous phase angles, computing phase differences between pairs of said numerical values spaced one quaternary symbol period apart, converting said phase differences using a sine/cosine look-up table to produce pairs of values representing pairs of soft data bits, and processing said pairs of values using an error correction algorithm to assess the credibility of said pairs of values.

2. A method according to claim 1 in which said quaternary phase modulation is Pi/4 differential QPSK.

3. An apparatus for demodulating and decoding quaternary phase modulated signals comprising:

means for receiving said signals and producing a hardlimited intermediate frequency signal, direct phase digitizing means for converting said hardlimited IF signal into a stream of numerical values representing instantaneous phase angles, a phase subtractor for computing phase differences between pairs of said numerical values with a given time spacing, conversion means for converting said phase differences into pairs of values representing pairs of soft data bits, and error correction means for processing said pairs of values to assess the credibility of said pairs of values.

4. A method according to claim 3 in which said quaternary phase modulation is Pi/4 differential QPSK.

5. A method of transmitting information between a first station and a second station in a radio communication system comprising the steps of:

assembling pairs of error correction coded information bits into quaternary symbols, switching a unit complex signal vector from a current position to a new position rotated by one of 45, –45, 135 or –135 degrees from said current position according to a value of said quaternary symbol, applying real and imaginary components of a sequence of said complex signal vectors to low-pass filters to obtain continuous I and Q waveforms, modulating cosine and sine radio frequency carriers with said I and Q waveforms and transmitting a sum of said modulated carriers as a complex signal from said first station, receiving said complex signal at said second station and producing a hardlimited intermediate frequency signal, processing said intermediate frequency signal using a direct phase digitizer to produce a stream of numerical values representing instantaneous signal phase angles, computing phase differences between pairs of said numerical values spaced one quaternary symbol apart, converting said phase differences to pairs of values representing pairs of soft information bits, and processing said pairs of information values using an error correction decoder to assess the credibility of said pairs of information.

6. A method according to claim 5 in which said converting step further comprises the step of using a look-up table.

7. A method according to claim 6 in which said look-up table contains sine/cosine values.

8. A method according to claim 5 in which said applying step further comprises the step of providing low-pass filters having a frequency response which is a square root of a Nyquist filter for a given symbol rate.

9. A method according to claim 8 in which said Nyquist filter has a raised cosine frequency response.

10. A method of demodulating quaternary phase modulated signals comprising the steps of:

receiving said quaternary phase modulated signals and producing a hardlimited intermediate frequency signal and a strength signal that is approximately indicative of the received signals' strength, converting said hardlimited signal and said strength signal into a stream of complex numbers using a logpolar digitizer, computing a complex product of pairs of said complex numbers spaced one quaternary symbol period apart with conjugation of one of each complex number pair to produce differential complex numbers containing soft error information, and processing said differential complex numbers using an error correction algorithm to produce data.

11. A method according to claim 10 in which said quaternary phase modulation is Pi/4 differential QPSK.

12. An apparatus for the demodulation of quaternary phase modulated signals comprising:

receiving means for receiving said modulated signals and producing a hardlimited intermediate frequency signal and an approximately logarithmic signal strength indication, means for digitizing said intermediate frequency signal and said signal strength indication into a stream of complex numbers, means for computing a product of pairs of said complex numbers spaced one quaternary symbol apart to produce differential complex numbers containing soft error information, error correction decoding means to process said differential complex numbers to reduce the number of transmission errors.

13. An apparatus according to claim 12 in which said quaternary phase modulation is Pi/4 differential QPSK.

14. A method of transmitting information between a first station and a second station in a radio communication system comprising the steps of:

assembling pairs of error correction coded information bits into quaternary symbols, switching a unit complex signal vector from a current position to a new position rotated by one of 45, –45, 135 or −135 degrees from said current position according to a value of said quaternary symbol, applying real and imaginary components of a sequence of said complex signal vectors to low-pass filters to obtain continuous I and Q waveforms, modulating cosine and sine radio frequency carriers with said I and Q waveforms and transmitting a sum of said modulated carriers as a complex signal from said first station, receiving said complex signal at said second station and producing a hardlimited intermediate frequency signal and an approximately logarithmic indication of signal strength, logpolar converting said hardlimited intermediate frequency signal and said signal strength indication into a stream of complex numbers, computing complex products of pairs of said complex numbers spaced one quaternary symbol period apart, one of which is conjugated, to produce differential complex numbers containing soft error information, and processing said differential complex numbers using an error correction decoder to obtain data.

15. A method of transmitting information between a first station and a second station in a radio communication system comprising the steps of:

assembling pairs of error correction coded information bits into quaternary symbols, interspersing said quaternary symbols between first and second patterns of symbols known to a receiver to obtain groups of symbols for transmission, transmitting said groups of symbols using Pi/4-DQPSK signals, receiving said transmitted signals at said second station and producing a stream of complex numbers therefrom, correlating said stream of complex numbers with said first and second patterns of symbols to determine first and second timings giving maximum correlation with said first and second patterns of symbols, respectively, and corresponding first and second correlation quality values, processing said first and second correlation quality values to determine whether said first or second timing is a preferred timing, wherein said processing includes quantizing said first and second correlation quality values into at least three quality levels, computing the complex products of pairs of said complex numbers spaced one quaternary symbol period apart starting at a position in said complex number stream indicated by said preferred timing, one pair being conjugated to produce differential complex numbers, and processing said differential complex numbers using an error correction decoder to obtain data.

16. A method according to claim 15 in which said preferred timing is equal to said first timing for a first number of product computations and equal to said second timing for a second number of product computations.

17. A method according to claim 15 in which one of said known symbol patterns is a Coded Digital Voice Color Code (CDVCC).

18. A method according to claim 15 in which said step of processing said first and second correlation quality further includes the steps of:

coarsely quantizing said first and second quality values using predetermined thresholds to produce first and second coarse quality indications, combining said coarse quality indications to obtain an address to a memory, and using said address to access said memory to obtain a value indicative of said preferred timing.

19. A method of transmitting information between a first station and a second station including:

assembling pairs of error correction coded information bits into quaternary information symbols, interspersing said quaternary symbols between first and second patterns of symbols known to the receiver as syncwords to obtain groups of symbols for transmission, transmitting said groups of symbols using Pi/4-DQPSK signals, receiving said transmitted signals at said second station and producing a stream of complex numbers therefrom, correlating said stream of complex numbers with said first and second syncwords to determine first and second timings giving maximum correlation with said first and second syncwords, respectively, and corresponding first and second correlation quality values, processing said first and second correlation quality values to determine a preferred demodulation algorithm from among a plurality of demodulation algorithms, demodulating said received transmitted signals using said preferred demodulation algorithm to produce demodulated information symbols, and processing said demodulated information symbols using an error correction decoder to obtain said information bits.

20. A method according to claim 19 in which said step of processing said first and second correlation quality further includes the steps of:

coarsely quantizing said first and second quality values using predetermined thresholds to produce first and second coarse quality indications, combining said coarse quality indications to obtain an address to a memory, and using said address to access said memory to obtain a value indicative of said demodulation algorithm.

21. A method according to claim 19 in which said plurality of available algorithms includes:

differential phase demodulation using a first or second symbol timing, forward or backward quasi-coherent demodulation using a first or second symbol timing, forward or backward echo-equalizing demodulation using transversal (FIR) equalizer, Decision Feedback Equalizer, or Viterbi Equalizer, and differential demodulation including cancellation of complex offset due to time-dispersion or echoes.

22. A method according to claim 21 wherein said step of demodulating further comprises the step of:

demodulating signals received on a first or second antenna using one of the plurality of algorithms.

23. A method according to claim 22 wherein said step of demodulating further comprises, the step of:

demodulating a weighted sum or difference of signals received on said first and second antenna.

24. An apparatus for diversity reception of Pi/4-DQPSK signals comprising first and second receiving means coupled to first and second receiving antennas for receiving said signals, analog-to-digital convertor means coupled to said first and second receiving means for producing first and second complex number streams, and signal processing means for processing said first and second complex number streams to produce demodulated symbols comprising:
  first complex multiplier means for computing a product of pairs of complex numbers spaced one DQPSK symbol apart in said first complex number stream, with one of said pair being conjugated, to produce a stream of first products,
  second complex multiplier means for computing a product of pairs of complex numbers spaced one DQPSK symbol apart in said second complex number stream, with one of said pair being conjugated to produce a stream of second products,
  complex adder means to sum corresponding first and second products to produce a stream of diversity combined values,
  complex correlator means to correlate said stream of diversity combined values with a known symbol pattern to determine a preferred timing, and
  selection means to select diversity combined values according to said preferred timing for extracting information bits.

25. An apparatus for diversity reception of Pi/4-DQPSK signals comprising:
  first and second receiving means coupled to first and second receiving antennas for receiving said signals,
  analog-to-digital convertor means coupled to said first and second receiving means for producing first and second complex number streams, and
  signal processing means for processing said first and second complex number streams to produce demodulated symbols comprising:
    complex correlator means to correlate said first and second complex number streams with a known symbol pattern to produce first and second correlation coefficients,
    weighted addition means to sum said first and second complex number streams weighted using said first and second correlation coefficients to produce diversity combined values,
    correlator means to correlate said diversity combined values with said known symbol pattern to produce third correlation coefficients, and
    processing means to process said first, second and third correlation coefficients to select a demodulation algorithm.

26. An apparatus according to claim 25 further comprising means for demodulating at least one of said first complex number stream, said second complex number stream, and said diversity combined values using said selected demodulation algorithm.

27. A method of transmitting information between a first and a second station comprising the steps of:
  coding some of said information using an error-correction coding algorithm to obtain coded symbols,
  interspersing said coded symbols with symbols representing a remainder of uncoded information between a first and second pattern of known symbols to obtain symbol groups for transmission,
  transmitting said groups of symbols from said first station to said second station,
  receiving s aid transmitted signal at said second station and producing a stream of complex numbers therefrom,
  correlating said stream of complex numbers with said first and second known symbol patterns to determine corresponding first and second timings for maximum correlation and corresponding first and second correlating quality values,
  processing said first and second correlation quality values to determine a preferred demodulation method from among a plurality of demodulation methods,
  demodulating said coded and uncoded symbols using said preferred demodulation method to obtain demodulated coded symbols and demodulated uncoded symbols,
  processing said demodulated coded symbols using an error correction decoder to obtain decoded symbols, and
  combining said decoded symbols with said demodulated uncoded symbols to reconstitute said information.

28. A method of transmitting information between a first and a second station comprising the steps of:
  coding some of said information using an error-correction coding algorithm to obtain coded symbols,
  interspersing said coded symbols with symbols representing remaining uncoded information and appending a pattern of known symbols to obtain symbol groups for transmission,
  transmitting said symbol groups from said first station to said second station as a radio signal,
  receiving said transmitted radio signal at said second station using a first antenna and a second antenna to produce a first received signal and a second received signal,
  processing said first and second received signals to obtain first and second streams of complex numbers,
  correlating said first and second stream of complex numbers with said known symbol pattern to determine corresponding first and second timings for maximum correlation and corresponding first and second correlation quality values,
  processing said first and second correlation quality values to select one of said first and second complex number streams for demodulation using said first or second timing, respectively, and demodulating said selected complex number stream to produce a number of demodulated symbols, wherein said processing includes quantizing said first and second correlation quality values into at least three quality levels,
  selecting demodulated symbols corresponding to said coded symbols and processing said selected symbols using an error-correction decoding method to obtain decoded symbols, and
  selecting demodulated symbols corresponding to said uncoded information symbols for combination with said decoded symbols to reconstitute said information.

29. A method of transmitting information between a first and a second station comprising the steps of:
  coding some of said information using an error-correction coding algorithm to obtain coded symbols,
  interspersing said coded symbols with symbols representing remaining uncoded information between patterns of known symbols to obtain symbol groups for transmission,
  transmitting said symbol groups from said first station to said second station as a radio signal,
  receiving said transmitted radio signal at said second station using a first antenna and a second antenna to produce a first received signal and a second received signal,
  processing said first and second received signals to obtain first and second streams of complex numbers, correlating said first and second streams of complex numbers with said known symbol patterns to determine a timing value for maximum correlation and a corresponding correlation quality value for each stream and pattern, processing said quality values to select one of said first or second complex number streams, a preferred timing and demodulation algorithm to produce demodulated symbols, selecting from said demodulated symbols those corresponding to said coded symbols and processing said selected symbols using an error-correction decoding method to obtain decoded symbols having a reduced probability of transmission error, and selecting demodulated symbols corresponding to said uncoded information symbols for combination with said decoded symbols to reconstitute said information.

30. A diversity radio receiving system for decoding information modulated radio signals comprising:

first and second antenna means coupled to a first and second receiver to produce first and second amplified received signals;

analog-to-digital conversion means for converting segments of said first and second amplified received signals into corresponding first and second numerical sample sets and storing said sets in a memory;

processing means coupled to said memory for computing from said sample sets a characteristic indicative of signal quality for each sample set;

decision means for using said signal quality characteristics to determine which of said sample sets shall be decoded by quantizing said signal quality characteristics into at least three quality levels; and decoding means for decoding the sample set chosen by said decision means to reproduce said information.

31. The diversity radio receiving system of claim 30, wherein:

said processing means is also for combining said first and second sample sets to produce a combined sample set and for computing a characteristic indicative of signal quality of each of said first, second and combined sample sets.

32. A receiving system according to claim 31 in which said processing means combines samples from said first and second sample sets that were analog-to-digital converted at corresponding times.

33. A receiving system according to claim 31 in which said processing means combines corresponding samples from said first and second sample sets that were analog-to-digital converted at offset times.

34. A receiving system according to claim 31 in which said quality indicating characteristic is a correlation with a known signal pattern embedded in said signal segment.

35. A receiving system according to claim 34 in which said combined sample sets are formed by weighted combination using said correlations to form complex weights.

36. A receiving system according to claim 31 in which said combined sample set is formed by multiplying samples from said first set taken one information symbol apart with conjugation of one sample and adding the product to a corresponding product calculated from said second set.

37. A receiving system according to claim 36 in which said corresponding product of samples from said second set corresponds with a time-offset to products of samples from said first set.

38. The diversity radio receiving system of claim 30 wherein:

said processing means is also for combining said first and second sample sets using a number of predetermined weightings to produce a corresponding number of combined sample sets and for computing a characteristic indicative of signal quality of each of said first, second and combined sample sets.

39. A receiving system according to claim 38 in which said processing means combines samples from said first and second sample sets that were analog-to-digital converted at corresponding times.

40. A receiving system according to claim 38 in which said processing means combines corresponding samples from said first and second sample sets that were analog-to-digital converted at offset times.

41. A receiving system according to claim 38 in which said quality indicating characteristic is a correlation with a known signal pattern embedded in said signal segment.

42. A receiving system according to claim 41 in which said combined sample sets are formed by weighted combination using said correlations to form complex weights.

43. A receiving system according to claim 30 in which said analog-to-digital conversion means is a direct phase digitizer.

44. A receiving system according to claim 30 in which said analog-to-digital conversion means is a logpolar complex signal digitizer.

45. A receiving system according to claim 30 in which said quality indicating characteristic is a signal strength averaged over said signal segment.

46. A receiving system according to claim 30 in which said signal quality indicating characteristic is a correlation with a known signal pattern embedded in said signal segment.

47. An apparatus for the demodulation of quaternary phase modulated signals comprising:

receiving means for receiving said modulated signals and producing a hardlimited intermediate frequency signal and an approximately logarithmic signal strength indication;

means for digitizing said intermediate frequency signal and said signal strength indication into a stream of complex numbers each representative of instantaneous complex vector values associated with said received modulated signals;

means for correlating said stream of complex numbers with at least one predetermined pattern to produce an indicator;

demodulating means for demodulating said stream of complex numbers using an equalizing algorithm depending on said indicator to produce real and imaginary symbol values compensated for multipath distortion; and error correction coding means to process said real and imaginary symbol values to reduce the number of transmission errors.

48. A diversity radio receiving system for decoding information modulated radio signals comprising:

first and second antenna means coupled to a first and second receiver to produce first and second amplified received signals;

analog-to-digital conversion means for converting segments of said first and second amplified received signals into corresponding first and second numerical sample sets and storing said sets in a memory;

combining means for combining said first and said second numerical sample sets to produced a combined sample set, and storing said combined sample set in said memory;

processing means coupled to said memory for computing from said sample sets a characteristic indicative of signal quality for each sample set;

decision means for using said signal quality characteristics to determine which of said sample sets shall be decoded; and decoding means for decoding the sample set chosen by said decision means to reproduce said information.

49. A receiving system according to claim 48, wherein said combining means combines said first and second numerical sets such that said first and/or said second numerical sets are weighted.

50. A receiving system according to claim 49, wherein said first and/or said second numerical sets are weighted by correlation terms which are produced by correlating said first and/or said second numerical sets with one or more known signal patterns.

51. A diversity radio receiving system for decoding information modulated radio signals comprising:

first and second antenna means coupled to a first and second receiver to produce first and second amplified received signals;

analog-to-digital conversion means for converting segments of said first and second amplified received signals into corresponding first and second numerical sample sets and storing said sets in a memory;

processing means coupled to said memory for computing signal quality characteristics for each sample set;

decision means for selecting, on the basis of said signal quality characteristics, a preferred demodulation strategy for use in demodulating a preferred sample set from among a plurality of pairings of demodulation strategies and sample sets;

decoding means for decoding the preferred sample set chosen by said decision means using said preferred demodulation strategy to reproduce said information.

52. A receiving system according to claim 51, wherein said demodulation strategies include:

forward demodulation in which demodulation proceeds in a forward direction, backward demodulation in which demodulation proceeds in a backward direction, and half-forward/half-backward demodulation in which demodulation proceeds in both a forward and backward directions.

53. A receiving system according to claim 51, further comprising:

combining means for combining said first and said second numerical sample sets to produce a combined sample set, and storing said combined sample set in said memory;

wherein said processing means and said decision means determine the preferred sample set and the preferred demodulation strategy from said first, second and combined sample sets.

54. A receiving system according to claim 53, wherein said combining means combines said first and second numerical sets such that said first and/or said second numerical streams are weighted.

* * * * *

UNITED STATES PATENT AND TRADEMARK OFFICE
CERTIFICATE OF CORRECTION

PATENT NO. : 5,841,816

DATED : November 24, 1998

INVENTOR(S) : Paul W Dent et al.

Page 1 of 2

It is certified that error appears in the above-identified patent and that said Letters Patent is hereby corrected as shown below:

Replace Table 3 in columns 7 and 8 with the following table:

Table 3

|   | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | H | H | F | F | F | F | F | F | F | F | F | F | F | F | F | F |
| 1 | H | H | H | F | F | F | F | F | F | F | F | F | F | F | F | F |
| 2 | B | H | H | H | F | F | F | F | F | F | F | F | F | F | F | F |
| 3 | B | B | H | H | H | F | F | F | F | F | F | F | F | F | F | F |
| 4 | B | B | B | H | H | H | F | F | F | F | F | F | F | F | F | F |
| 5 | B | B | B | B | H | H | H | H | H | F | F | F | F | F | F | F |
| 6 | B | B | B | B | B | H | H | H | H | H | F | F | F | F | F | F |
| 7 | B | B | B | B | B | H | H | H | H | H | F | F | F | F | F | F |
| 8 | B | B | B | B | B | H | H | H | H | H | H | H | F | F | F | F |
| 9 | B | B | B | B | B | B | H | H | H | H | H | H | H | F | F | F |

UNITED STATES PATENT AND TRADEMARK OFFICE
CERTIFICATE OF CORRECTION

PATENT NO. : 5,841,816

DATED : November 24, 1998

INVENTOR(S) : Paul W Dent et al.

It is certified that error appears in the above-identified patent and that said Letters Patent is hereby corrected as shown below:

```
a   B B B     B B B B B H H     H H H H H F
b   B B B     B B B B B H H     H H H H H F
c   B B B     B B B B B H H     H H H H H H
d   B B B     B B B B B B B     H H H H H H
e   B B B     B B B B B B B     H H H H H H
f   B B B     B B B B B B B     B B H H H H
```

Signed and Sealed this

Twentieth Day of July, 1999

Attest:

Attesting Officer

Q. TODD DICKINSON

Acting Commissioner of Patents and Trademarks